United States Patent
Namera et al.

(10) Patent No.: US 12,522,024 B2
(45) Date of Patent: Jan. 13, 2026

(54) TIRE

(71) Applicant: Sumitomo Rubber Industries, Ltd., Kobe (JP)

(72) Inventors: Takayuki Namera, Kobe (JP); Yuto Hashimoto, Kobe (JP); Sho Nakajima, Kobe (JP); Ryuhei Sanae, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 30 days.

(21) Appl. No.: 18/534,823

(22) Filed: Dec. 11, 2023

(65) Prior Publication Data

US 2024/0198731 A1 Jun. 20, 2024

(30) Foreign Application Priority Data

Dec. 19, 2022 (JP) .................................. 2022-202445

(51) Int. Cl.
*B60C 11/12* (2006.01)
*B60C 11/03* (2006.01)

(52) U.S. Cl.
CPC ...... *B60C 11/0306* (2013.01); *B60C 11/0304* (2013.01); *B60C 11/1218* (2013.01); *B60C 11/1263* (2013.01); *B60C 2011/1213* (2013.01)

(58) Field of Classification Search
CPC ............. B60C 11/1263; B60C 11/1218; B60C 11/0306; B60C 11/0304; B60C 2011/1213
See application file for complete search history.

(56) References Cited

U.S. PATENT DOCUMENTS

| 2002/0007889 | A1* | 1/2002 | Eromaki ................. B60C 11/12 |
| | | | 152/209.17 |
| 2010/0212794 | A1 | 8/2010 | Watabe et al. |
| 2012/0103492 | A1 | 5/2012 | Knispel |
| 2019/0210410 | A1 | 7/2019 | Tikka et al. |
| 2021/0387479 | A1 | 12/2021 | Hashimoto |

(Continued)

FOREIGN PATENT DOCUMENTS

| JP | 2000-289413 A | * 10/2000 |
| JP | 2013-39871 A | 2/2013 |
| JP | 2015-20663 A | 2/2015 |

(Continued)

OTHER PUBLICATIONS

Machine translation for Japan 2000-289413 (Year: 2025).*
Extended European Search Report for European Application No. 23211493.4, dated May 8, 2024.

*Primary Examiner* — Steven D Maki
(74) *Attorney, Agent, or Firm* — Birch, Stewart, Kolasch & Birch, LLP

(57) ABSTRACT

A tire comprises a tread portion provided with blocks including a first block provided with a plurality of sipes. Each sipe comprises a zigzag portion in a cross section perpendicular to the sipe length direction, and a zigzag portion in a cross section parallel to the ground contacting top surface of the first block. Each of the sipes is provided with at least one tie bar protruding radially outwardly from the bottom of the sipe and terminating without reaching the ground contacting top surface. The sipes includes a first sipe having the tie bar at a first position in the tire axial direction, and a second sipe having the tie bar at a second position in the tire axial direction different from the first position.

10 Claims, 13 Drawing Sheets

(56) References Cited

U.S. PATENT DOCUMENTS

2023/0322028 A1* 10/2023 Nakajima ........... B60C 11/1236
152/209.18

FOREIGN PATENT DOCUMENTS

| JP | 2021-195051 A | 12/2021 |
| JP | 2022-48823 A | 3/2022 |
| WO | WO-2022/050287 A1 * | 3/2022 |

* cited by examiner

TIRE

TECHNICAL FIELD

The present disclosure relates to a tire.

BACKGROUND ART

Patent Document 1 below discloses a pneumatic tire for use in the winter season. This tire has an outside shoulder land portion divided into outside shoulder blocks by outside shoulder lateral grooves extending in a tire axial direction. The outside shoulder blocks is divided into a first block piece on the outside tread edge side and a second block piece on the inside tread edge side by a first longitudinal narrow groove extending in a tire circumferential direction. Further, the first block piece is provided with first sipes, and the second block piece is provided with second sipes.

Patent Document 1: Japanese Patent Application Publication No. 2021-195051

SUMMARY OF THE INVENTION

Problems to be Solved by the Invention

The sipes formed in the tread block help to improve on-ice performance.
On the other hand, each block segment divided by the sipes tends to collapse by the load when contacting with the ground.
There is a problem such that, due to such collapse of the block segment piece, strain is concentrated on the bottom of the sipe, and cracks are likely to occur in the bottom. For this reason, in a tire in which sipes are formed in the blocks, the durability of the bottom portion of the sipes against a load (hereinafter, sometimes referred to as "load bearing performance") was required to be improved.

The present disclosure was made in view of the above circumstances, and a primary objective thereof is to provide a tire capable of improving the load bearing performance while maintaining the on-ice performance.

Means for Solving the Problems

According to the present disclosure, a tire comprising a tread portion provided with a plurality of blocks including at least one first block,
wherein
the first block is provided, in its ground contacting top surface, with a plurality of sipes extending in a tire axial direction and arranged at intervals in a tire circumferential direction,
each of the plurality of sipes has a zigzag-shaped portion in a cross section perpendicular to a sipe length direction, and a zigzag-shaped portion in a cross section parallel to the ground contacting top surface,
each of the plurality of sipes is provided with at least one tie bar which locally protrudes outward in the tire radial direction from a sipe bottom, and terminates without reaching to the above-said ground contacting top surface, and
the plurality of sipes includes
a first sipe in which the tie bar is positioned at a first position in the tire axial direction, and
a second sipe in which the tie bar is positioned at a second position in the tire axial direction different from the first position.

Effects of the Invention

Therefore, in the tire according to the present disclosure, it is possible to improve the load bearing performance, while maintaining the on-ice performance.

DETAILED DESCRIPTION OF THE INVENTION

Figure 1:
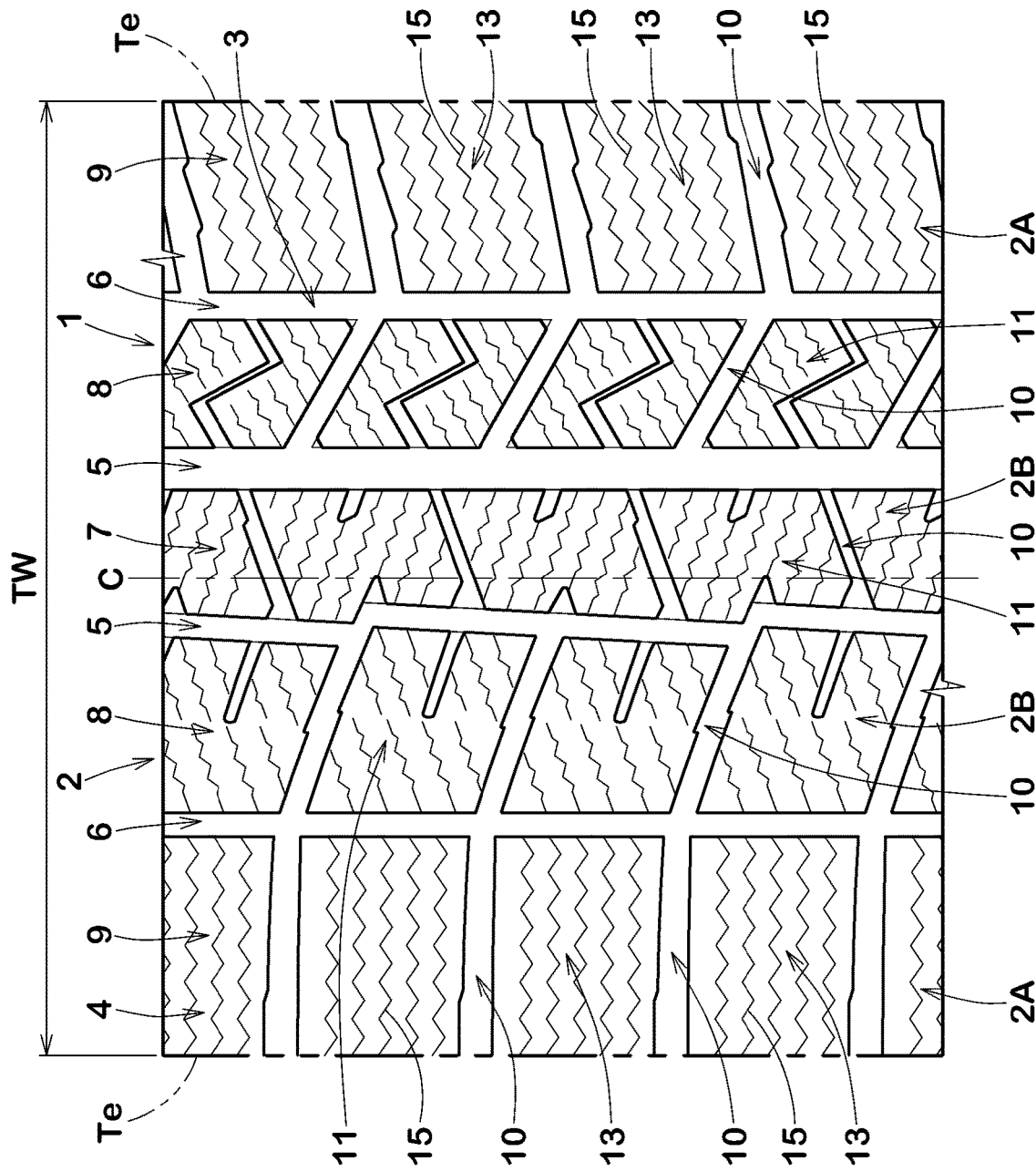
FIG. 1 is a developed partial view of a tread portion of a tire as an embodiment of the present disclosure.

An embodiment of the present disclosure will now be described in detail in conjunction with accompanying drawings.
FIG. 1 is a developed partial view of a tread portion 2 of a tire 1 as an embodiment of the present disclosure.
As shown in FIG. 1, the tire 1 in the present embodiment is intended for use in the winter season.
The tire 1 in the present embodiment is designed for a pneumatic tire for passenger cars. However, the present disclosure is not limited to the present embodiment, and may be applied, for example, to heavy duty vehicles tires.
The tread portion 2 is provided with a plurality of circumferential grooves 3 continuously extending in a tire circumferential direction and disposed between two tread edges Te. Thus, the tread portion 2 is divided by these circumferential grooves 3 into a plurality of land portions 4.
The tread edges Te corresponds to the outermost contact positions in the tire axial direction when the tire 1 in its normal state is set on a horizontal flat surface at a camber angle of 0 degrees and loaded with 70% of a normal load.
In the case of pneumatic tires for which various standards have been established, the "normal state" of a tire means a state of the tire mounted on a regular rim, and inflated to a regular internal pressure, but loaded with no tire load.
In the case of tires for which various standards are not yet defined or non-pneumatic tires, the "normal state" of a tire means a standard usage condition according to the purpose of use of the tire, which is a condition in which the tire is not mounted on the vehicle and no tire load is applied.
In this specification, unless otherwise noted, the dimensions of each part or position of the tire refer to those measured under the normal state.
Incidentally, known methods can be appropriately applied to the method for measuring the dimensions unless otherwise specified.

The "regular rim" is a wheel rim specified for the tire in a standard system including standards on which the tire is based, for example, "Standard Rim" in JATMA, "Design Rim" in USA, and "Measuring Rim". in ETRTO, The "regular internal pressure" is the air pressure specified for the tire in the standard system including standards on which the tire is based, for example, the "maximum air pressure" in JATMA, the "Inflation Pressure" in ETRTO, and the maximum pressure given in the "Tire Load Limits at Various Cold Inflation Pressures" table in TRA or the like.

In the case of pneumatic tires for which various standards have been established, the "normal load" is the tire load specified for the tire in the standard system including standards on which the tire is based, for example, "LOAD CAPACITY" in JATMA, the maximum value listed in the table "TIRE LOAD LIMITS AT VARIOUS COLD INFLATION PRESSURES" for TRA, and "LOAD CAPACITY" in ETRTO.

In the case of tires for which various standards have not been established, the "normal load" refers to the maximum load that can be applied when using the tire according to the above-mentioned standards.

In the present embodiment, the tread portion 2 is provided with the four circumferential grooves 3 including two crown circumferential grooves 5 and two shoulder circumferential grooves 6.

The two crown circumferential grooves 5 are disposed one on each side of the tire equator C.

The two shoulder circumferential grooves 6 are respectively disposed axially outside the two crown circumferential grooves 5.

The present disclosure is however, not limited to such groove arrangement.

The circumferential grooves 3 may adopt various modes such as those extending linearly in the tire circumferential direction and those extending in a zigzag shape in the tire circumferential direction.

Figure 2:
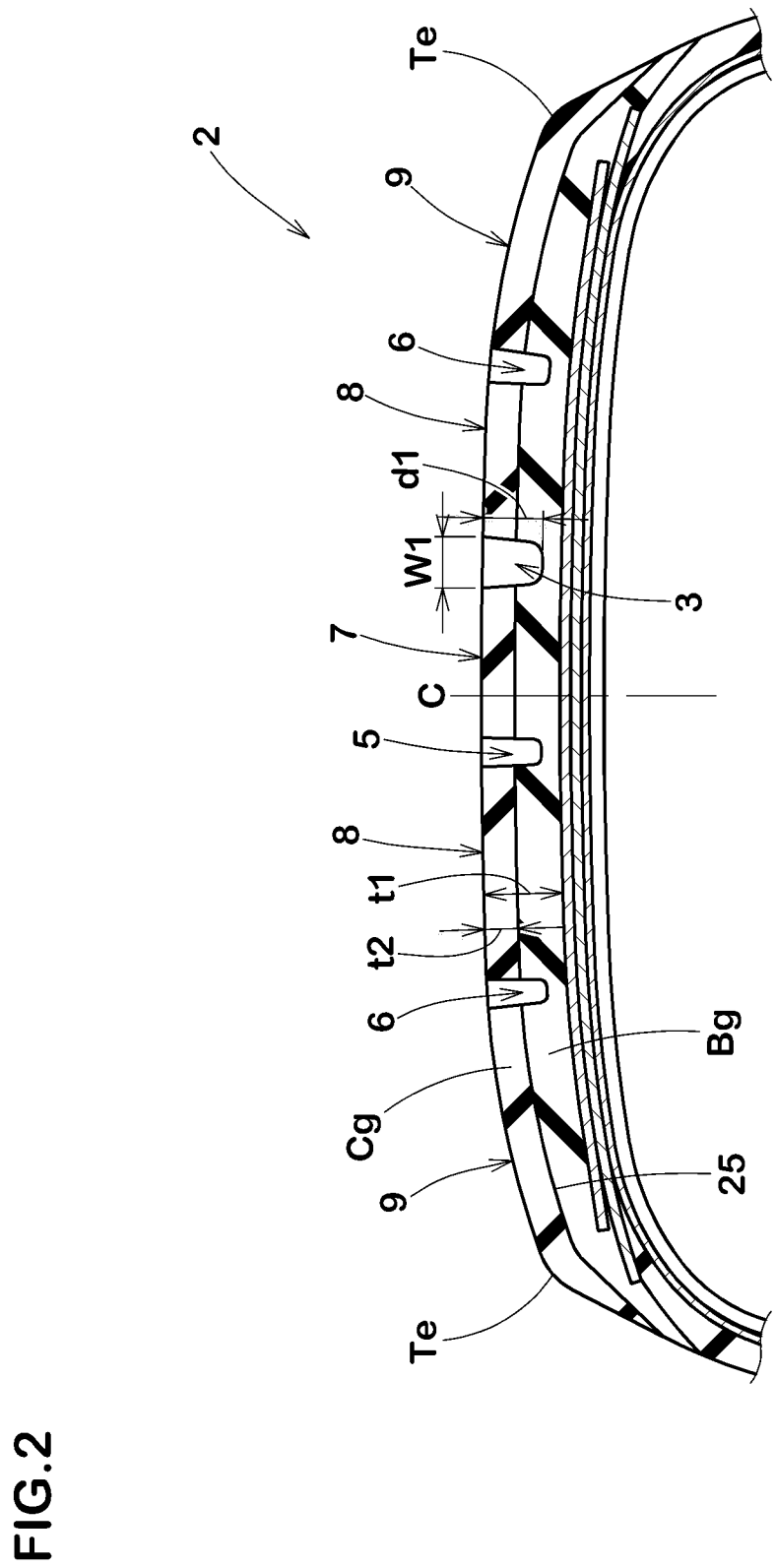
FIG. 2 is a cross-sectional view of the tread portion.

FIG. 2 shows a cross section of the tread portion 2, wherein the sipes and the lateral grooves observed in the plan view of the tread portion 2 are omitted here.

It is preferable that the groove widths of the circumferential grooves 3 are not less than 3 mm as shown in FIG. 2.

The maximum groove width W1 of the circumferential grooves 3 is, for example, 2.0% to 5.0% of the tread width TW (shown in FIG. 1).

The maximum depth d1 of the circumferential groove 3 is, for example, 5 to 15 mm. Incidentally, the tread width TW corresponds to the distance in the tire axial direction between the tread edges Te under the normal state.

As shown in FIG. 1, the tread portion 2 in the present embodiment is divided into five land portions 4 by the four circumferential grooves 3 described above.

The five land portions 4 are one crown land portion 7, two middle land portions 8m and two shoulder land portions 9. The crown land portion 7 is defined between the two circumferential crown grooves 5.

Each of the middle land portions 8 is defined between the crown circumferential groove 5 and one of the shoulder circumferential grooves 6.

Each of the shoulder land portions 9 is defined between one of the shoulder circumferential grooves 6 and the adjacent tread edge Te.

The tread portion 2 in the present embodiment is provided with a plurality of lateral grooves 10. Thereby, each of the five land portions 4 is circumferentially divided by the lateral grooves 10 into a plurality of blocks 11 in a row.

The above-said plurality of blocks 11 includes at least one first block 13.

In the present embodiment, the shoulder land portion 9 includes a plurality of the first blocks 13 arranged in the tire circumferential direction. The plurality of first blocks 13 constitute the tread edge Te.

Figure 3:
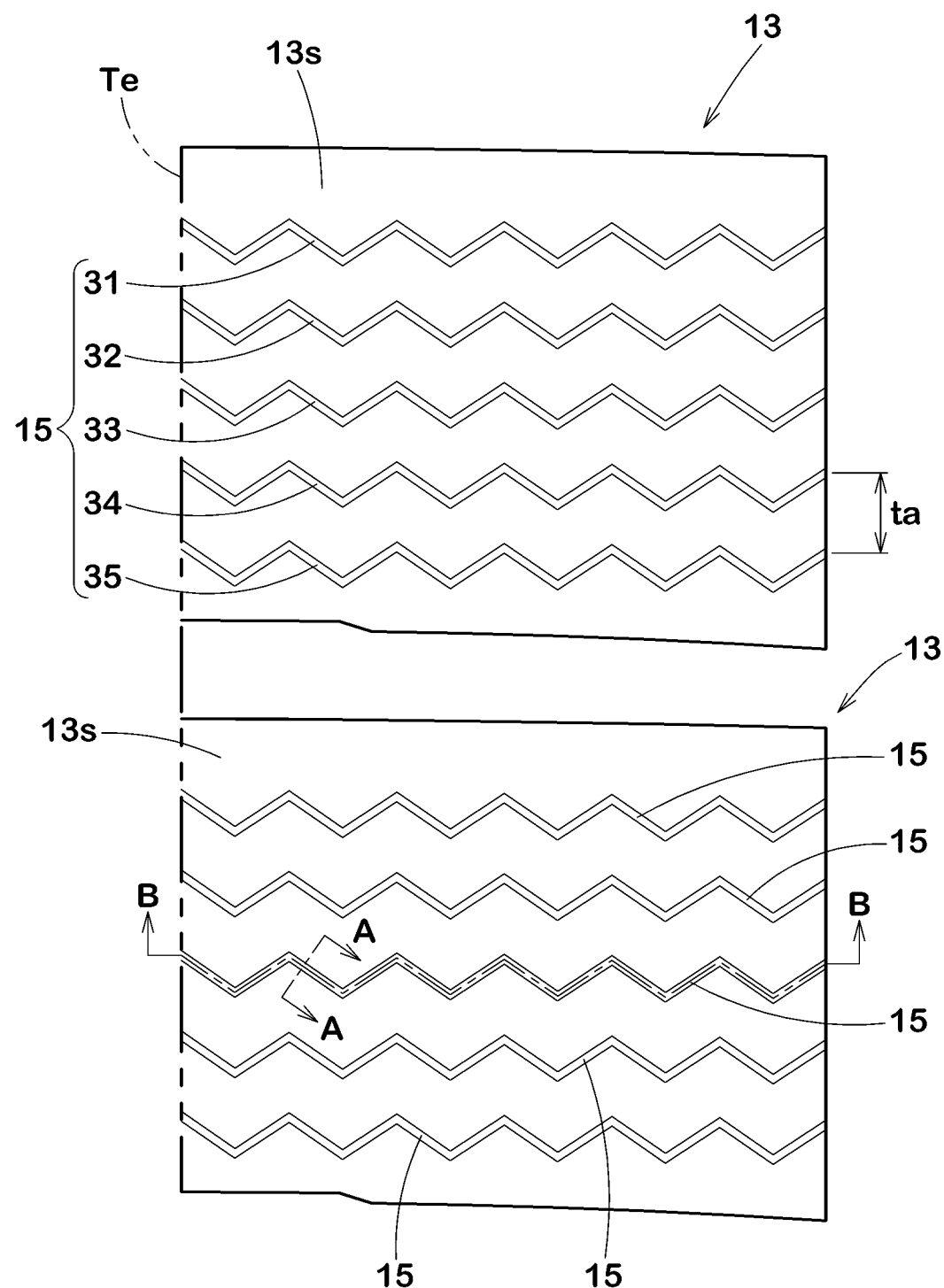
FIG. 3 is an enlarged top view of the first block shown in FIG. 1.

In FIG. 3. there is shown an enlarged view of the plurality of first blocks 13.

The plurality of first blocks 13 shown in FIG. 3 are included in the shoulder land portion 9 on the left side of FIG. 3.

As shown in FIG. 3, the plurality of sipes 15 extending in the tire axial direction are arranged in the ground contacting top surface 13s at intervals in the tire circumferential direction.

The term "sipe" means a narrow groove having a width not more than 1.5 mm between two opposite side walls, inclusive of a cut having no substantial width.

A chamfer may be provided at the edge of the opening of the sipe.

Further, the bottom 15d of the sipe 15 may be communicated with a wide portion as described later.

Figure 4:
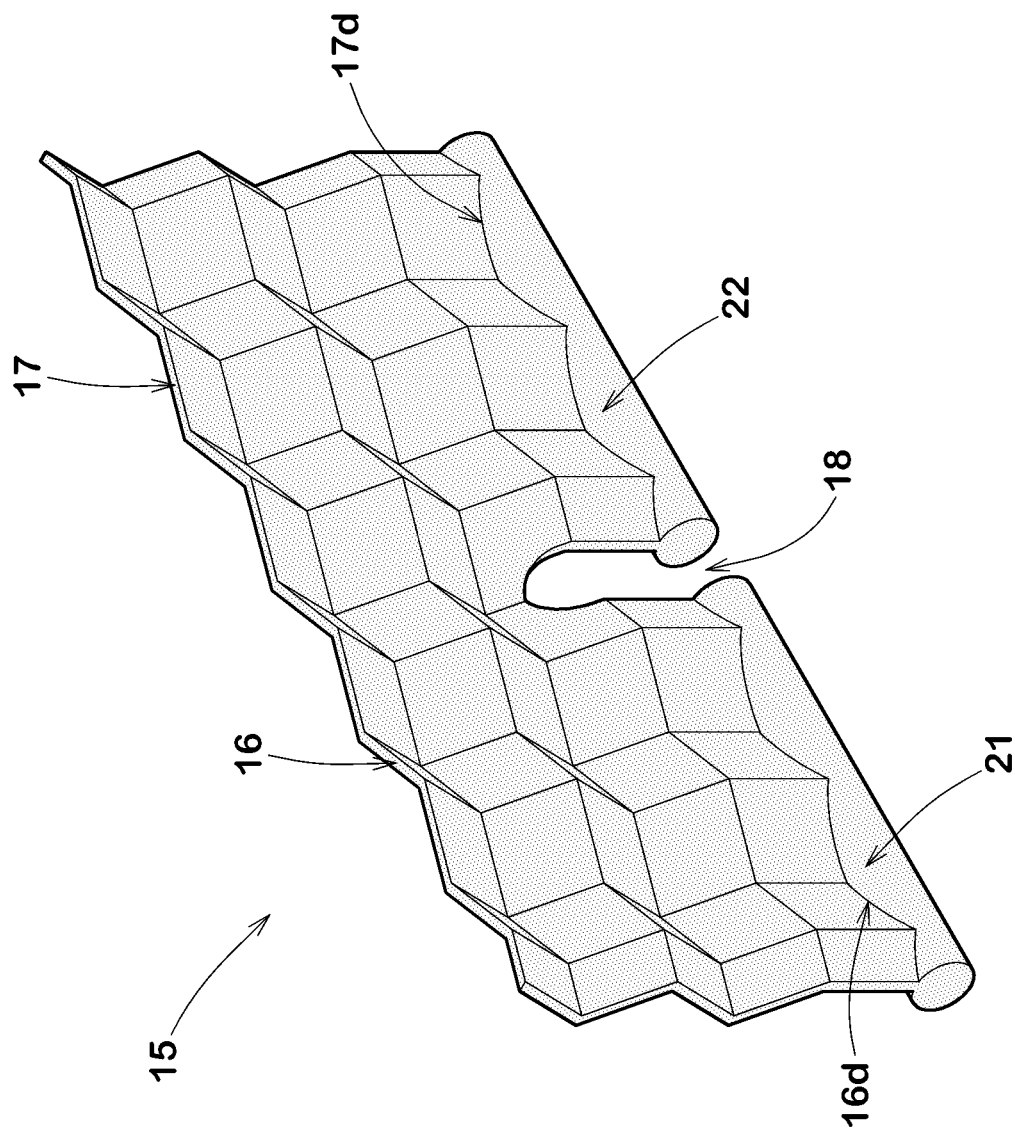
FIG. 4 is an enlarged perspective view of the internal space of the sipe.

FIG. 4 is an enlarged perspective view showing the internal space of the sipe 15.

As shown in FIG. 4, the internal space are lightly dotted.

Figure 5:
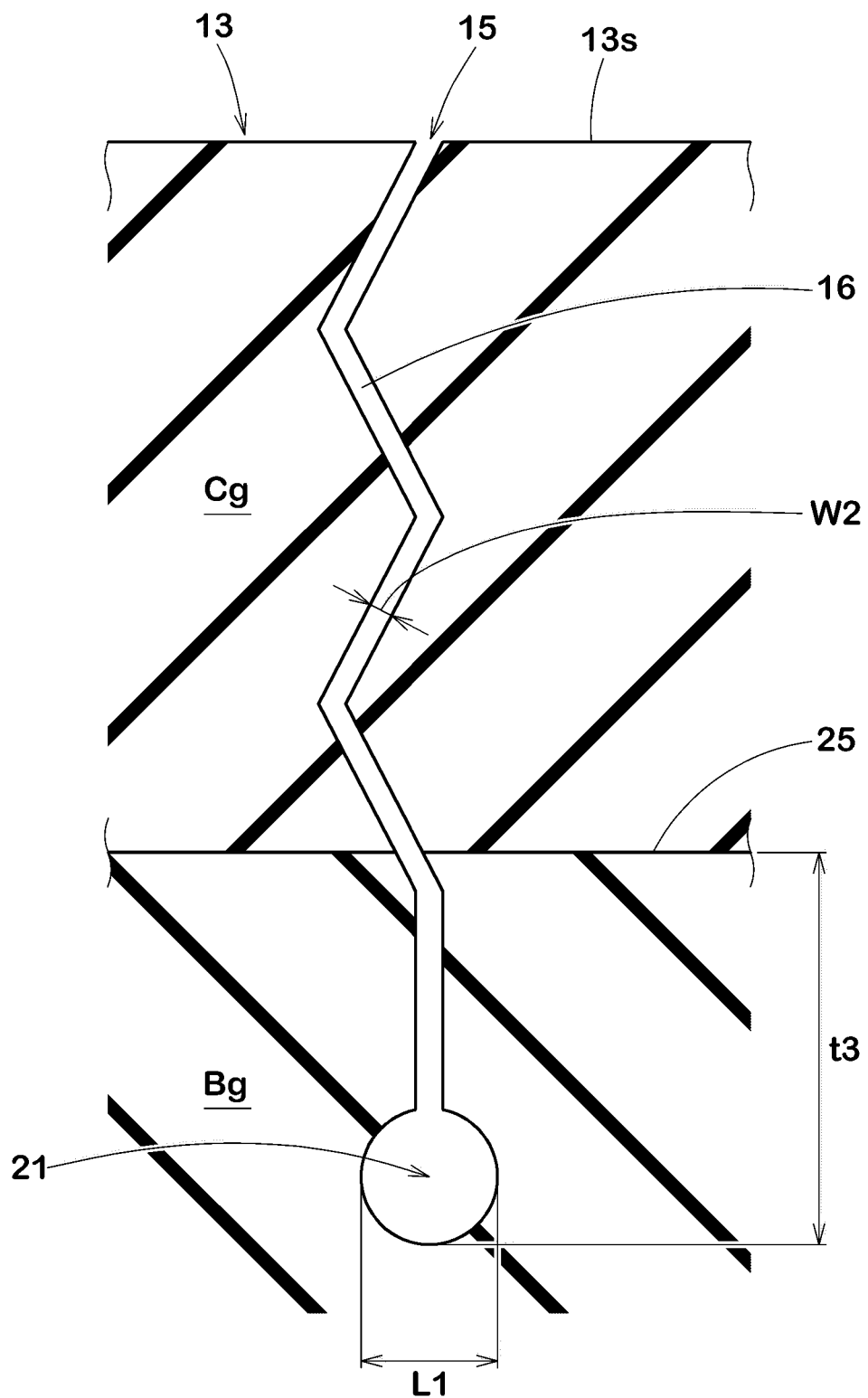
FIG. 5 is a cross-sectional view of the sipe taken along line A-A of FIG. 3.

FIG. 5 shows a cross-sectional view of the sipe 15 perpendicular to the sipe length direction.

Figure 6:
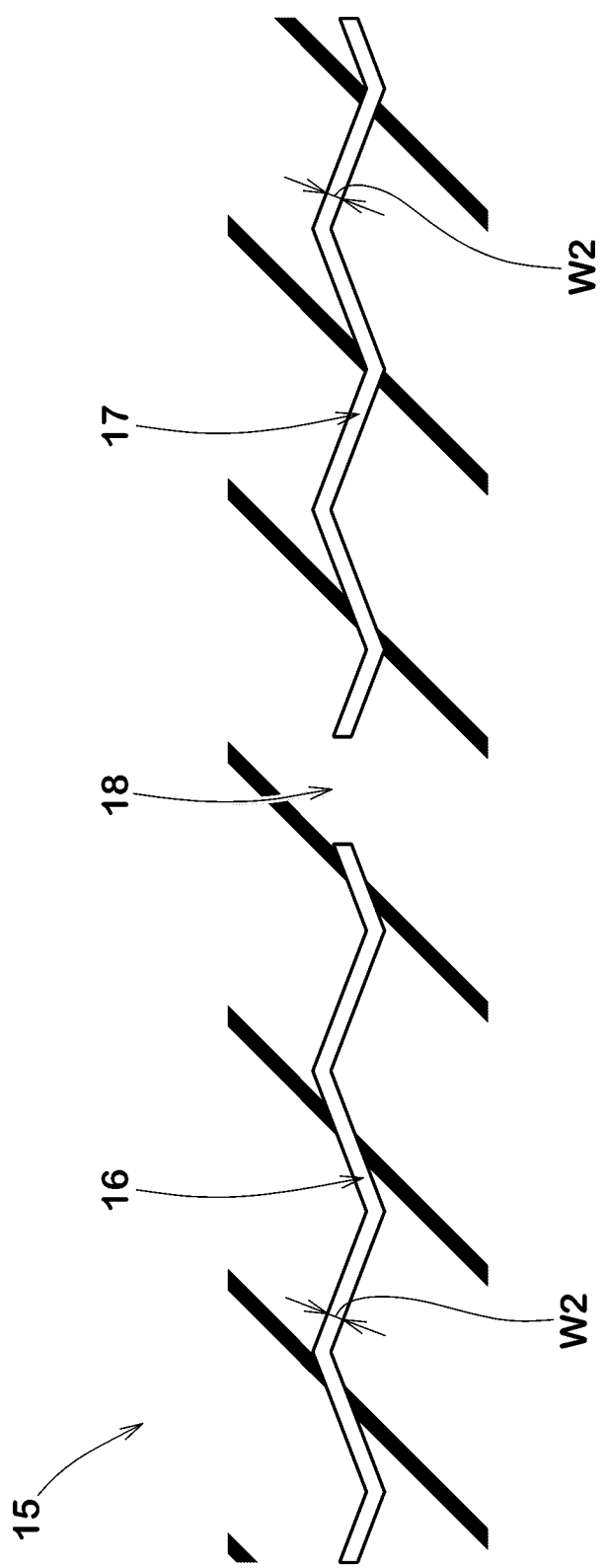
FIG. 6 is a cross-sectional view of the sipe taken parallel to the ground contacting top surface of the first block.

FIG. 5 is a cross-sectional view including a first wide portion 21, and corresponds to the cross-sectional view taken along line AA in FIG. 3. The first wide portion 21 will be described later, FIG. 6 is a cross-sectional view of the sipe 15 taken along a plane parallel to the ground contacting top surface 13s of the first block 13.

The cross-sectional view of FIG. 6 includes a tie bar 18 which will be described later.

In the present embodiment, as shown in FIGS. 4 and 5, each of the sipes 15 includes a zigzag-shaped portion in a cross section orthogonal to the sipe length direction. Further, as shown in FIGS. 4 and 6, each of the sipes 15 includes a zigzag portion in a cross section parallel to the ground contacting top surface 13s.

Here, the expression "include a zigzag-shaped portion" means that the part which vibrates in a zigzag is formed in at least one position.

In the present embodiment, as a preferable example, in both the cross section orthogonal to the sipe length direction and the cross section parallel to the ground contacting top surface 13s, the sipe is zigzag-shaped as a whole.

Figure 7:
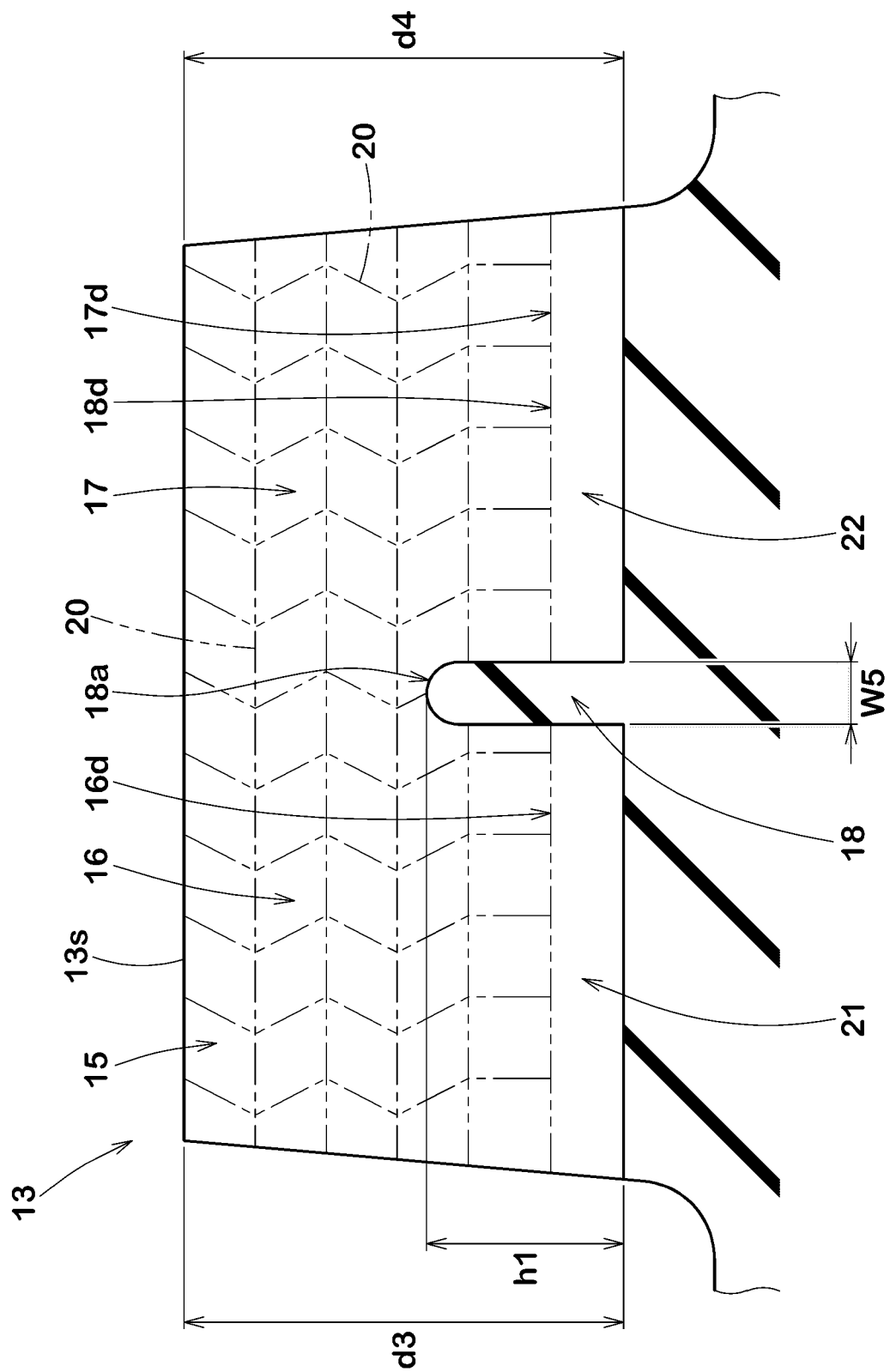
FIG. 7 is a cross-sectional view of the sipe taken along line B-B of FIG. 3.

FIG. 7 is a cross-sectional view of the sipe 15 taken along the length direction of the sipe 15.

The cross-sectional view of FIG. 7 corresponds to the cross-sectional view taken along line BB of FIG. 3.

In FIG. 7, double-dots chain lines 20 corresponding mountain lines and valley lines of concavities and convexities formed in the opposite side walls of the sipe.

Further, as shown in FIG. 7, the sipe 15 is provided with at least one tie bar 18.

The tie bar 18 locally protrudes outward in the tire radial direction from the bottom 18d of the sipe, and terminates without reaching the ground contacting top surface 13s of the first block 13.

Figure 8:
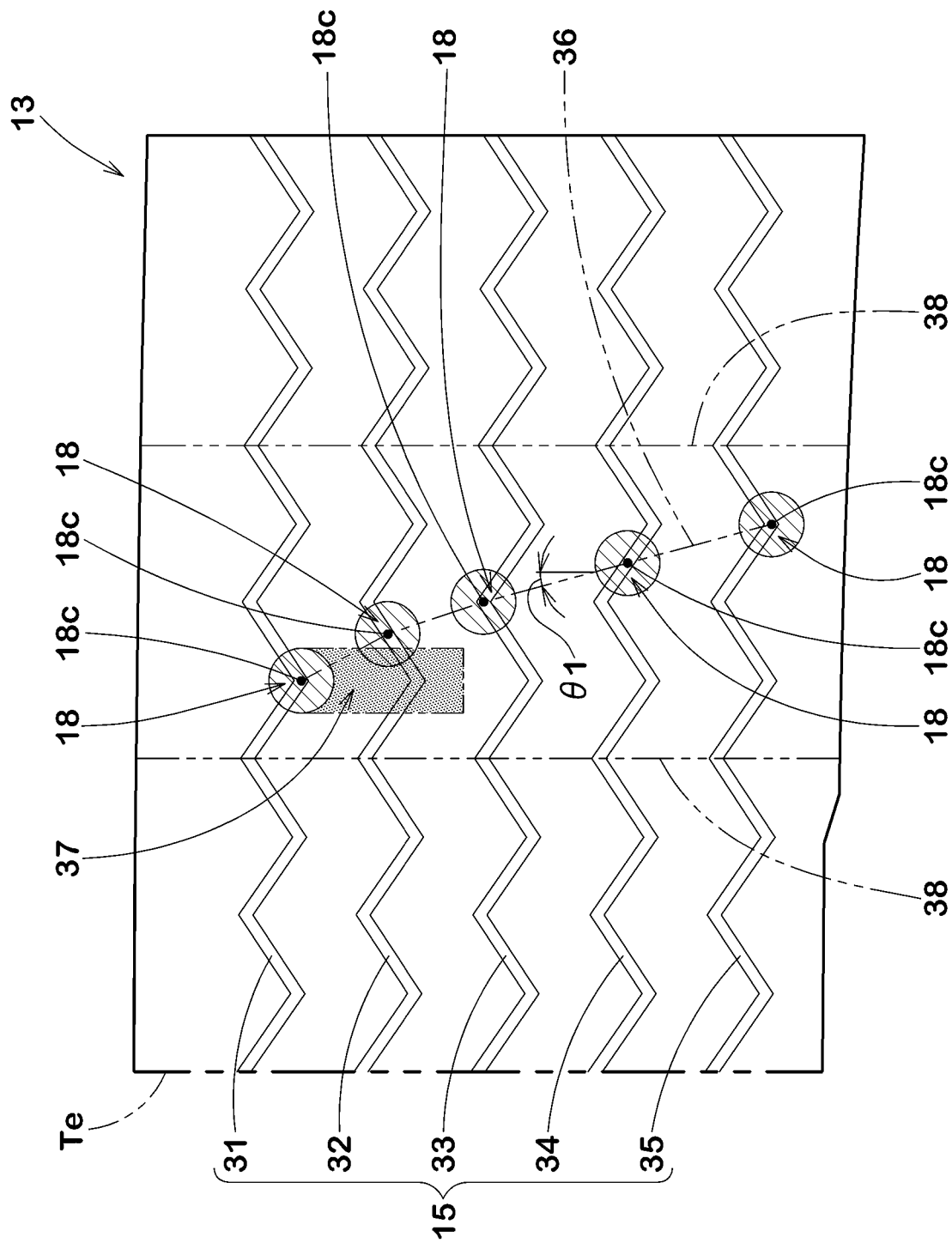
FIGS. 8 to 13 are enlarged top views of the first blocks each showing an example of the arrangement of the tie bars.

FIG. 8 is an enlarged top view of the first block 13, wherein the positions of the tie bars 18 of the respective sipes 15 are indicated by hatched circles.

In the present embodiment, as shown in FIG. 8, the sipes 15 provide in one first block 13 include at least a first sipe 31 having the tie bar 18 at a first axial position, and a second sipe 32 having the tie bar 18 at a second axial sipe 31 different from the first axial position. Here, two tie bars located at different axial positions means that the center 18c in the sipe length direction of the tie bar 18 of the first sipe 31 is displaced from that of the second sipe 32.

Thus, in the present embodiment, it is possible that, in the top view of the first block 13, a virtual zone 37 (dotted in FIG. 8), which is formed by extending the axial extent of the tie bar 18 of the first sipe 31 toward the second sipe 32 in parallel with the tire circumferential direction, may partially overlaps with the tie bar 18 of the second sipe 32.

However, as another arrangement, it is also possible that the virtual zone 37 does not overlap with the tie bar 18 of the second sipe 32.

The tire 1 of the present embodiment can improve the load bearing performance while maintaining the on-ice performance by adopting the above-described configuration. The reason is as follows.

In the present embodiment, as shown in FIGS. 5 and 6, each of the sipes 15 has the zigzag-shaped portion in the cross section orthogonal to the sipe length direction, and also has the zigzag-shaped portion in the cross section parallel to the ground contacting top surface 13s of the first block 13. Further, as shown in FIG. 7, each of the sipes 15 is provided with at least one tie bar 18.

When a load from the ground acts on the first block 13, the side walls of the sipes 15 facing each other are strongly engaged with each other so as to maintain the apparent rigidity of the first block 13. Further, the tie bars 18 maintain the rigidity of the first block 13. As a result, the collapse of the first block 13 is effectively suppressed, and the strain at the bottom of the first sipe 31 can be suppressed, therefore, the load bearing performance is improved.

In addition, as shown in FIG. 8, in the present embodiment, as the tie bars 18 of the first sipe 31 and the second sipe 32 are located at different axial positions, the first block 13 is surely prevented from falling down. and the load bearing performance is further improved. In addition, since the tie bars 18 described above suppress local falling down of the block, even if a large shear stress acts on the first block 13, for example, during braking on ice, the entire edges of the first sipe 31 and the second sipe 32 exerts a large frictional force to maintain the on-ice performance.

For the above reasons, the tire 1 can improve the load bearing performance while maintaining the on-ice performance.

Hereinafter, the present embodiment will be described in more detail.

Each configuration described below represents a specific aspect of the present embodiment. Therefore, the present disclosure can exhibit the above effects even if it does not have the configuration described below.

Further, even if any one of the configurations described below is applied singly to the tire of the present disclosure having the features described above, an improvement in performance corresponding to each configuration can be expected.

Furthermore, when some of the respective configurations described below are applied in combination, it is possible to expect a combined improvement in performance according to each configuration.

As shown in FIG. 1, when the tread portion 2 is axially divided into four equal parts: two outer parts 2A, which are regions on the tread edge Te side, and two inner parts 2B, which are regions on the tire equator C side, the plurality of first blocks 13 is preferably arranged in the land portion 4 included in the outer part 2A.

In the present embodiment, the plurality of first blocks 13 is included in the shoulder land portion 9, and the plurality of first blocks 13 forms the tread edge Te.

Thereby, since the sipes 15 are arranged in the shoulder land portion 9 where ground contact pressure tends to become high, the load bearing performance is reliably improved.

Preferably, 2 to 7 sipes 15 are disposed per one first block 13.

In the present embodiment, as shown in FIG. 3, five sipes 15 are disposed per one first block 13, and each sipe 15 crosses the first block 13 in the tire axial direction.

Further, in the present embodiment, except for the sipes 15, the first block 13 is not provided with recesses such as grooves.

However, the present disclosure is not limited to such arrangement. For example, the first block 13 may be provided with a narrow groove extending in the tire circumferential direction.

The interval "ta" between two sipes 15 adjacent in the tire circumferential direction (corresponds to the distance in the tire circumferential direction between the sipe center lines) is, for example, 3.0 to 7.0 mm, preferably 4.0 to 6.0 mm. Thereby, it is possible to exhibit excellent on-ice performance while suppressing uneven wear of the first block 13.

In the present embodiment, as shown in FIG. 7, the sipe 15 is provided with only one tie bar 18 at a position other than the ends in the sipe length direction.

However, the sipe arrangement is not limited to such example. The sipe 15 may be provided with a plurality of tie bars 18.

In the present embodiment, as shown in FIG. 7, the tie bar 18 extends in the tire radial direction with a constant width W5 except for the radially outer end portion 18a which has an arcuate outer surface convex toward the ground contacting top surface 13s. The constant width W5 of the tie bar 18 in a cross section along the length direction of the sipe 15 is, for example, in a range from 0.5 to 5.0 mm.

The height h1 in the tire radial direction from the bottom of the first wide portion 21 which will be described later, to the radially outer end of the tie bar 18, is preferably set in a range from 30% to 70% of the maximum depth d3 from the ground contacting top surface 13s of the first block 13 to the bottom of the first wide portion 21. Such tie bars 18 serve to improve the load bearing performance and the on-ice performance in a well-balanced manner.

As shown in FIG. 8, the tie bar 18 is preferably disposed in a center region of each sipe 15 in its longitudinal direction. Therefore, when the first sipe 31 is divided into three equal parts in the sipe length direction, it is preferable that the above-said first position is located in the central part. Similarly, when the second sipe 32 is divided into three equal parts in the sipe length direction, it is preferable that the above-said second position is located in the central part. That is, the center 18c of each tie bar 18 in the sipe length direction is located within the central part. Thereby, the central part of the first block 13 in the tire axial direction is effectively reinforced.

As long as the center 18c is located within the central part, a portion of the tie bar 18 may be outside the central part. In FIG. 8, the boundary lines 38 between three equal parts are indicated by double-dots chain line.

The plurality of sipes 15 provided in one first block 13 are not limited to the first sipe 31 and the second sipe 32 only. In the present embodiment, in addition to the first sipe 31 and the second sipe 32, a third sipe 33, a fourth sipe 34, and a fifth sipe 35 provided per one first block 13.

In FIG. 8, the first sipe 31 to the fifth sipe 35 are arranged in order from one side to the other side in the tire circumferential direction.

Further, in FIG. 8, the positions at which the tie bars 18 of the sipes 31 to 35 are provided are indicated by hatched circles.

The third sipe 33 has the tie bar 18 at a third position in the tire axial direction different from the first position and the second position.

The fourth sipe 34 has the tie bar 18 at a fourth axial position in the tire axial direction.

The fifth sipe 35 has the tie bar 18 at a fifth position in the tire axial direction.

The fourth position is different from the first to third positions.

The fifth position is different from the first to fourth positions.

The second position is between the first position and the third position in the tire axial direction. Thereby, the on-ice performance and the load bearing performance are further improved.

The first position and the second position are on one side in the tire axial direction of the third position.

The fourth position and the fifth position are on the other side in the tire axial direction of the third position.

The fourth position is between the third position and the fifth position in the tire axial direction.

Thereby, it is possible to suppress uneven wear in the region where these sipes 15 are provided, while obtaining the above-described effects.

In the present embodiment, for each sipe 15 provided in the first block 13, the tie bar 18 is located in the central part when the sipe 15 is divided into three equal parts in the sipe length direction as described above.

It is preferable that, for every two of the sipes 15 adjacent to each other in the tire circumferential direction, a virtual zone, which is formed by extending the axial extent of the tie bar 18 of one of the two sipes toward the other of the two sipes in parallel with the tire circumferential direction, partially overlaps with the tie bar of the other of the two sipes. Thereby, the central portion of the first block 13 in the tire axial direction is effectively reinforced, and the load-bearing performance is improved.

In FIG. 8, tie bar arrangement lines 36 are indicated by double-dot chain lines. Each of the tie bar arrangement lines 36 is an imaginary line connecting the centers of two of the tie bars 18 adjacent in the tire circumferential direction.

In the present embodiment, in a top view of the first block, each of the tie bar arrangement lines 36 is inclined in one direction with respect to the tire circumferential direction. The angle θ1 of each tie bar arrangement line 36 with respect to the tire circumferential direction is, for example, 10 to 30 degrees.

As a result, uneven wear resistance and the load bearing performance are improved in a well-balanced manner.

In the present disclosure, the tie bar arrangement is not limited to the above example, and various arrangements can be adopted.

Figure 9:
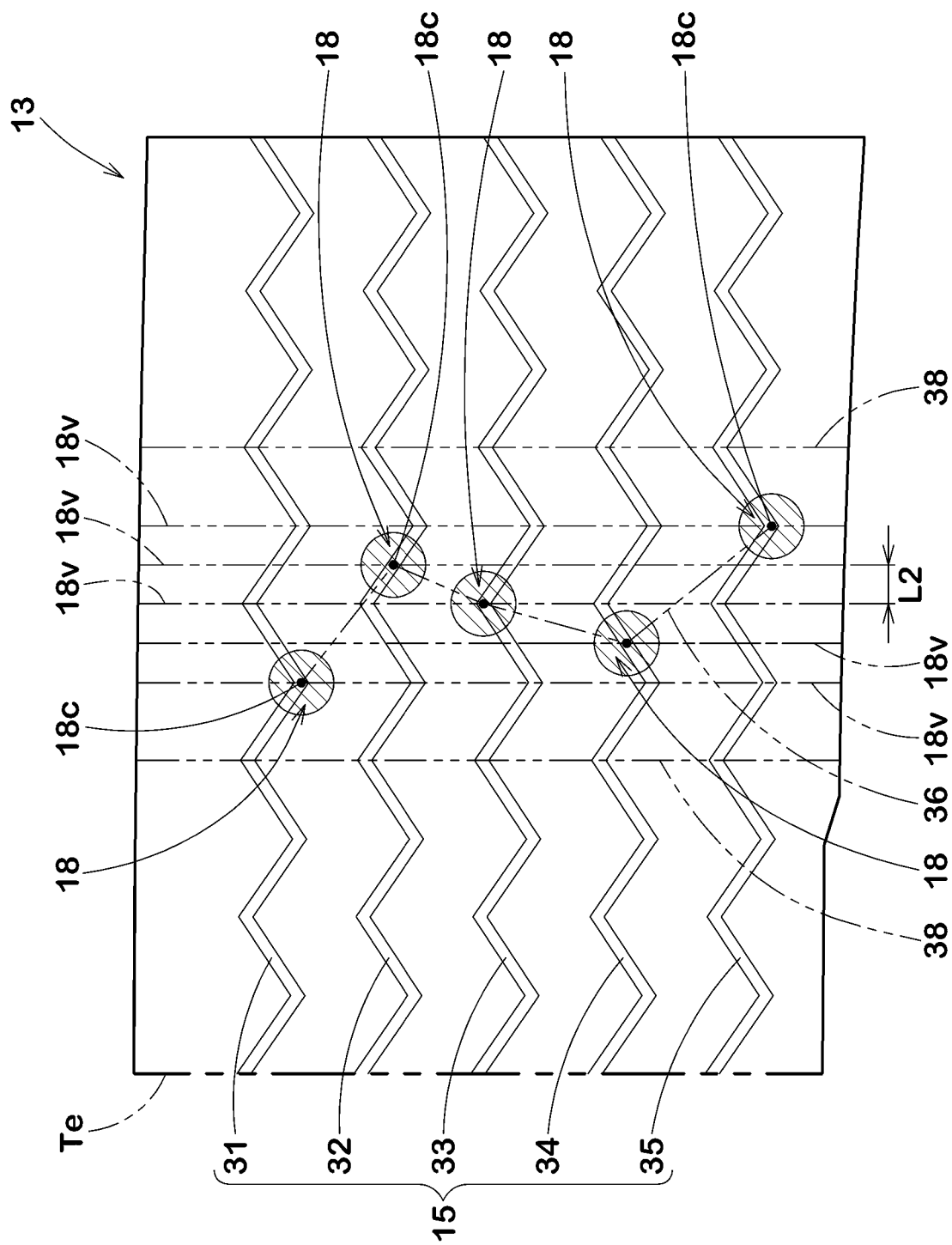
Figure 10:
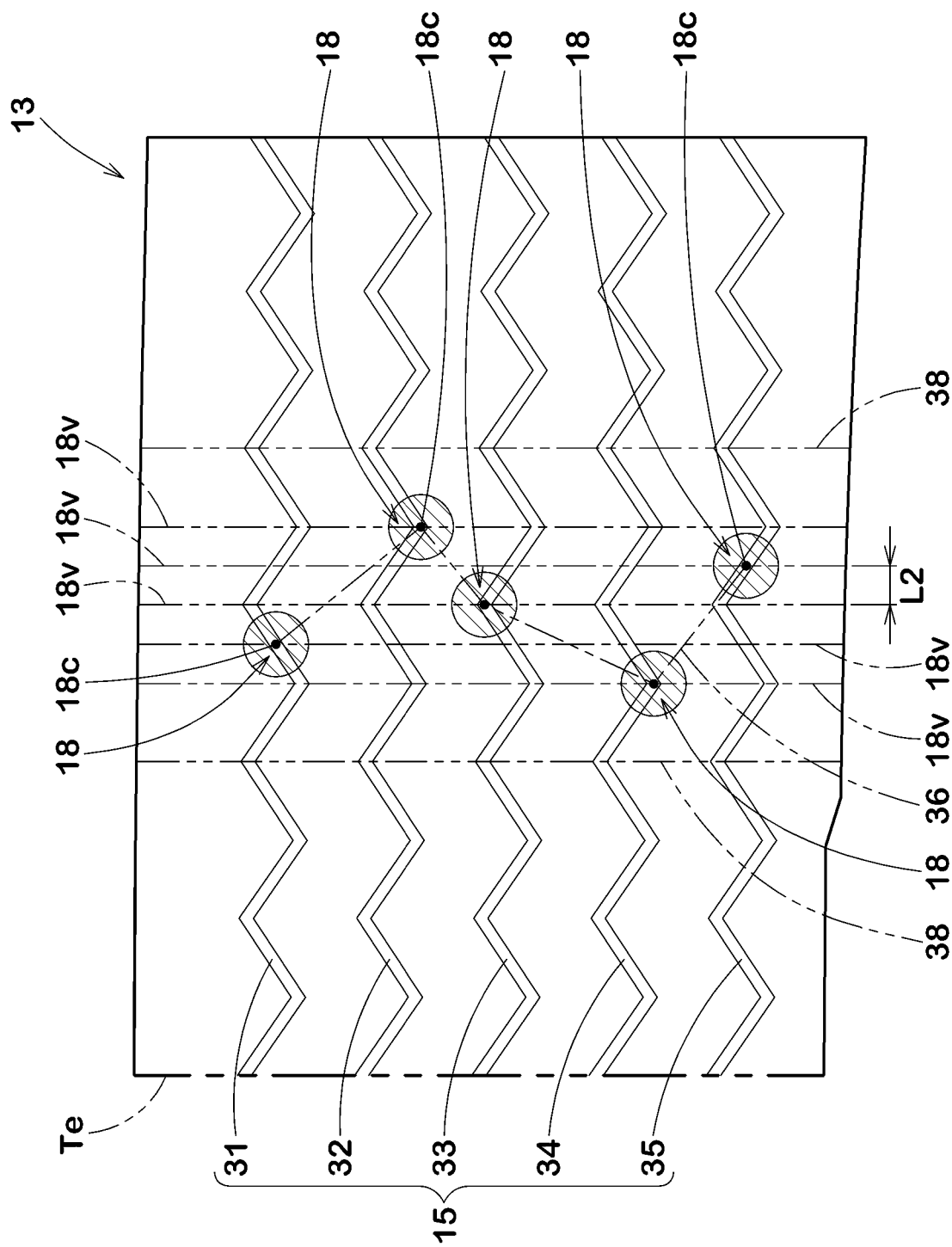
Figure 11:
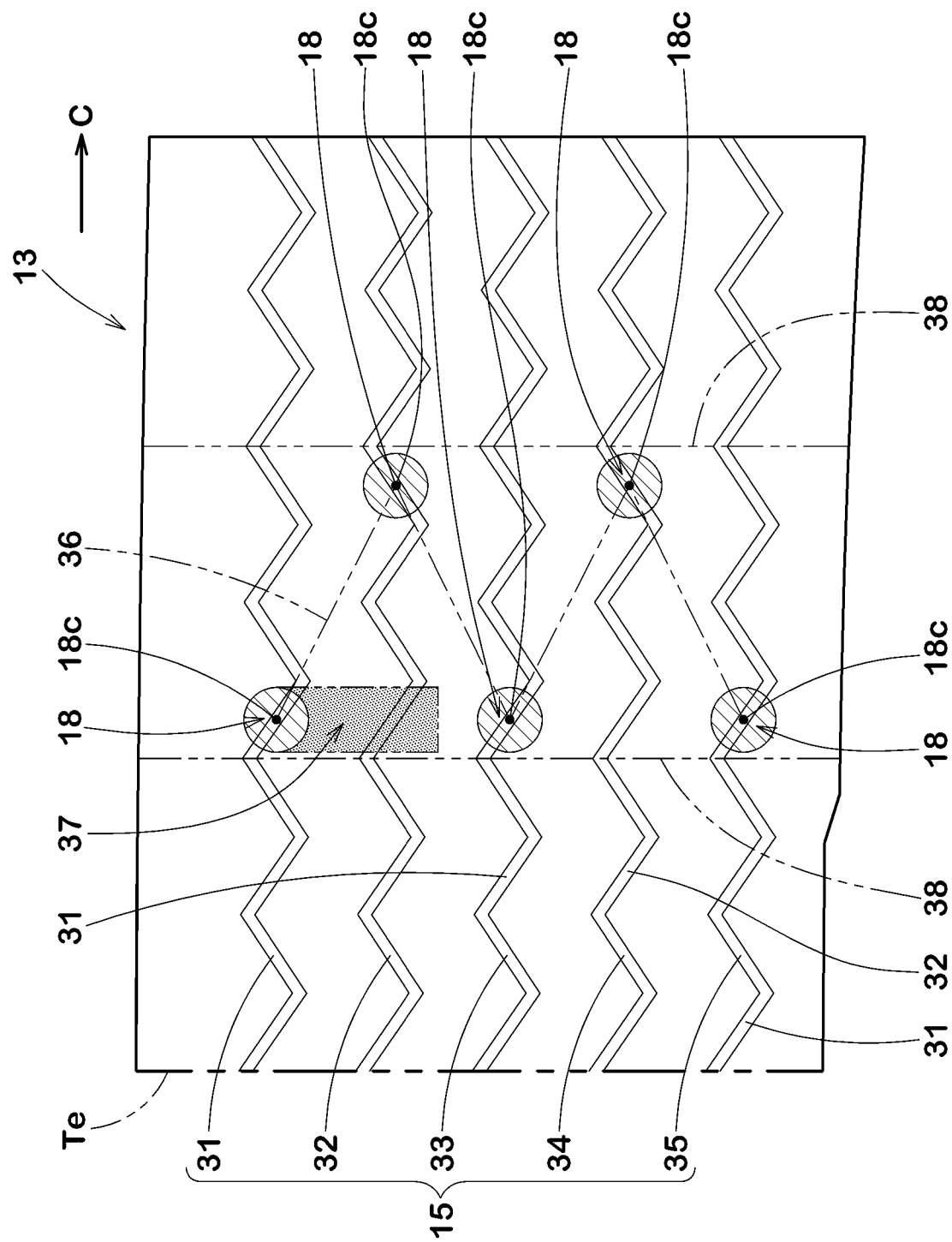

FIGS. 9 to 11 each show a top view of the first block 13 as another example of the tie bar arrangement.

In FIGS. 9 to 11, the same reference numerals are given to elements that are common to the above-described example, and the above-described configurations can be applied thereto.

In the examples shown in FIGS. 9 to 10, the tie bar 18 of each sipe 15 is arranged in a central part when the sipe 15 is divided into three equal parts in the longitudinal direction. And the tie bar arrangement lines 36 extend in a zigzag pattern.

In the examples shown in FIGS. 9 and 10, in the top view of the first block 13, tie bar center lines 18v extending parallel to the tire circumferential direction through the respective centers 18c of the tie bars 18, are displaced in the tire axial direction. Such arrangement of the tie bars 18 helps to further improve the load bearing performance.

In the examples shown in FIGS. 9 and 10, it is preferable that the tie bar centerlines 18v of the tie bars 18 are respectively placed on virtual lines which are drawn in parallel to the tire circumferential direction at substantially equal spacings L2.

The "substantially equal spacing" means that the difference between the minimum value and the maximum value of the spacings L2 between the tie bar center lines 18v is not more than 15% of the maximum value.

For example, The spacings L2 are in a range from 50% to 200% of the maximum width W5 of the tie bars 18.

As a result, the above effects can be reliably obtained.

In the example shown in FIG. 9, in a top view of the first block 13, a virtual zone (not shown), which is formed by extending the axial extent of the tie bar 18 of the second sipe 32 toward the third sipe 33 in parallel to the tire circumferential direction, overlaps with the tie bar 18 of the third sipe 33.

Further, in the top view of the first block 13, a virtual zone (not shown), which is formed by extending the axial extent of the tie bar 18 of the third sipe 33 toward the fourth sipe 34 in parallel to the tire circumferential direction, overlaps with the tie bar 18 of the fourth sipe 34.

Such arrangement of the tie bars 18 helps to further increase the load bearing performance.

In the example shown in FIG. 10, in a top view of the first block 13, a virtual area (not shown), which is formed by extending the axial extent of the tie bar 18 of the second sipe 32 toward the third sipe 33 in parallel to the tire circumferential direction, does not overlap with the tie bar 18 of the third sipe 33.

Further, in the top view of the first block 13, a virtual zone (not shown), which is formed by extending the axial extent of the tie bar 18 of the third sipe 33 toward the fourth sipe 34 in parallel to the tire circumferential direction, does not overlap with the tie bar 18 of the fourth sipe 34.

As a result, the reinforcing effect by the tie bars 18 acts over a wide range, and uneven wear of the first block 13 can be suppressed.

In the example shown in FIG. 11, among the first to fifth sipes 31 to 35 arranged from one side to the other side in the tire circumferential direction, the tie bar 18 of the third sipe 33 and the tie bar 18 of the fifth sipe 35 are located at the same axial position as the first position of the first sipe 31. That is, the third sipe 33 and the fifth sipe 35 are configured as "the first sipe 31 having the tie bar 18 at the first position in the tire axial direction".

On the other hand, the tie bar 18 of the fourth sipe 34 is located at the same axial position as the second position of the second sipe 32. That is, the fourth sipe 34 is configured as "the second sipe 32 having the tie bar 18 at the second position in the tire axial direction". With such sipe arrangement, this example can be said that the first sipe 31 having the tie bar 18 at the first position in the tire axial direction, and the second sipe 32 having the tie bar 18 at the second position in the tire axial direction are alternately arranged in the tire circumferential direction.

As a result, the tie bar arrangement lines 36 form a zigzag line extending in the tire circumferential direction.

In such example, as the tie bars 18 adjacent in the tire circumferential direction are separated from each other in the tire axial direction, uneven wear of the first block 13 can be further suppressed.

In this example, in a top view of the first block 13, a virtual zone 37, which is formed by extending the axial extent of the tie bar 18 of the first sipe 31 toward the second sipe 32 in parallel with the tire circumferential direction, does not overlap with the tie bar 18 of the second sipe 32. On the other hand, the first position is located in a central part when the first sipe 31 is divided into three equal parts in the longitudinal direction of the sipe.

Also, the second position is located in a central part when the second sipe 32 is divided into three equal parts in the longitudinal direction of the sipe.

The positions of the tie bars 18 are not limited to the above examples.

As a modified example of that shown in FIG. 11, it may be possible that:
- when the first sipe 31 is divided into three equal parts in the sipe longitudinal direction, the first position is located in a part on the tread edge Te side; and
- when the second sipe 32 is divided into three equal parts in the sipe longitudinal direction, the second position is located in a part on the tire equator C side.

In such modified example, since no tie bar 18 is arranged in a central part of the sipe 15, each sipe 15 can exhibit high water absorption performance, thereby exhibiting excellent on-ice performance.

As a further modified example of that shown in FIG. 11, it may be possible that: the centers 18c of the tie bars 18 are axially displaced from each other. Thereby, uneven wear of the first block 13 is suppressed.

Figure 12:
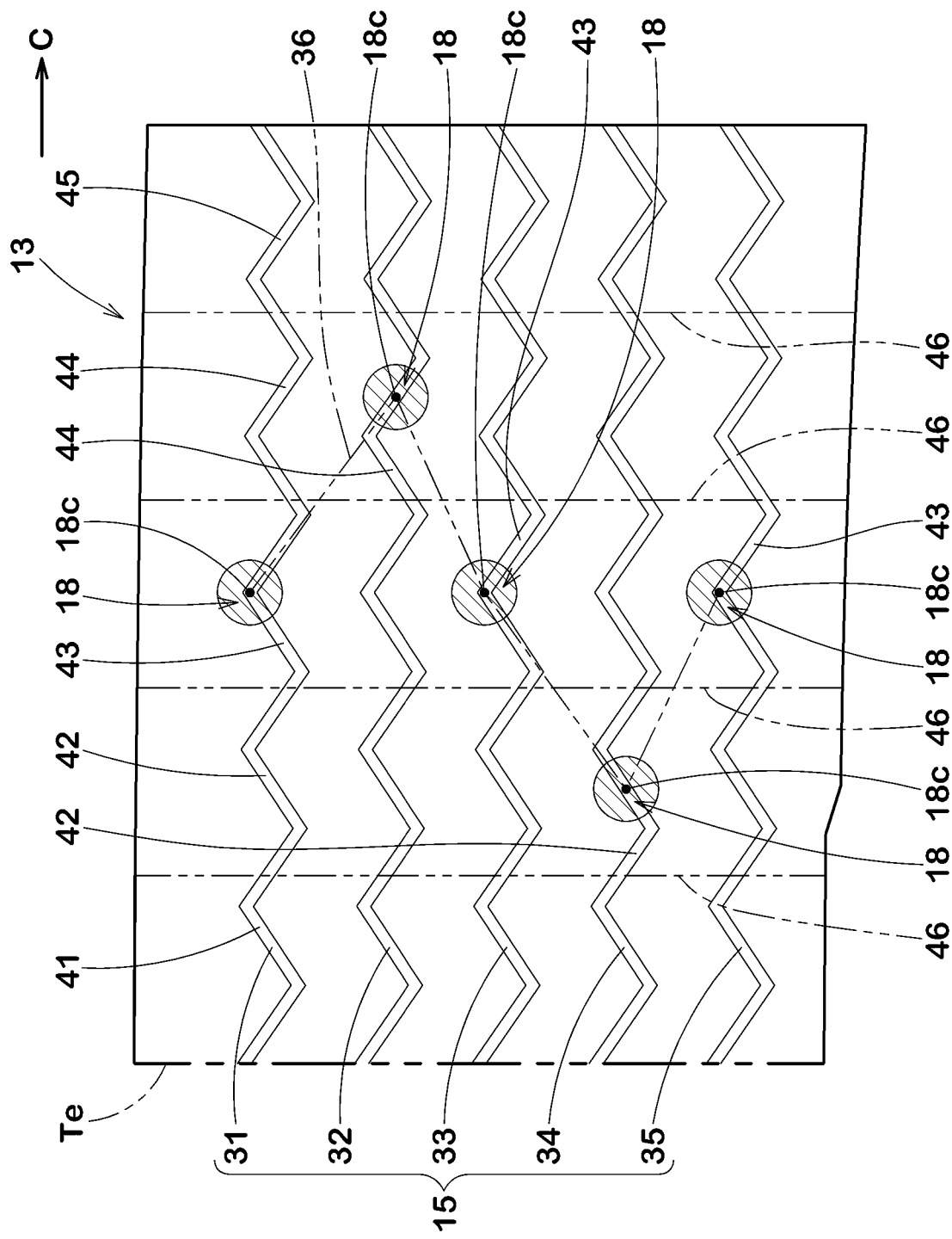

FIG. 12 shows a top view of the first block 13 as another example of the tie bar arrangement.

In this first block 13, the first sipe 31 to the fifth sipe 35 are arranged in order from one side to the other side in the tire circumferential direction.

Each sipe 15 is divided into five equal parts in the longitudinal direction of the sipe, namely, a first part 41, a second part 42, a third part 43, a fourth part 44 and a fifth part 45.

The first part 41 is arranged closest to the tread edge Te.
The second part 42 is adjacent to the first part 41 on the tire equator C side.
The third part 43 is adjacent to the second part 42 on the tire equator C side.
The fourth part 44 is adjacent to the third part 43 on the tire equator C side.
The fifth part 45 is adjacent to the fourth part 44 on the tire equator C side. That is, the fifth part 45 is positioned closest to the tire equator C among the five regions.

In the example shown in FIG. 12,
the first position is located in the third part 43 of the first sipe 31,
the second position is located in the fourth part 44 of the second sipe 32,
the third position is located in the third part 43 of the third sipe 33,
the fourth position is located in the second part of the fourth sipe 34, and
the fifth position is located in the third part 43 of the fifth sipe 35.

As a result, the tie bar arrangement lines 36 oscillate and extend in a wavy shape.

Such arrangement of the sipes 15 helps to improve the on-ice performance and the load-bearing performance in a well-balanced manner.

As a modified example of that of FIG. 12, it may be possible that the centers 18c of the tie bars 18 are axially displaced from each other. Thereby, uneven wear of the first block 13 is suppressed.

Figure 13:
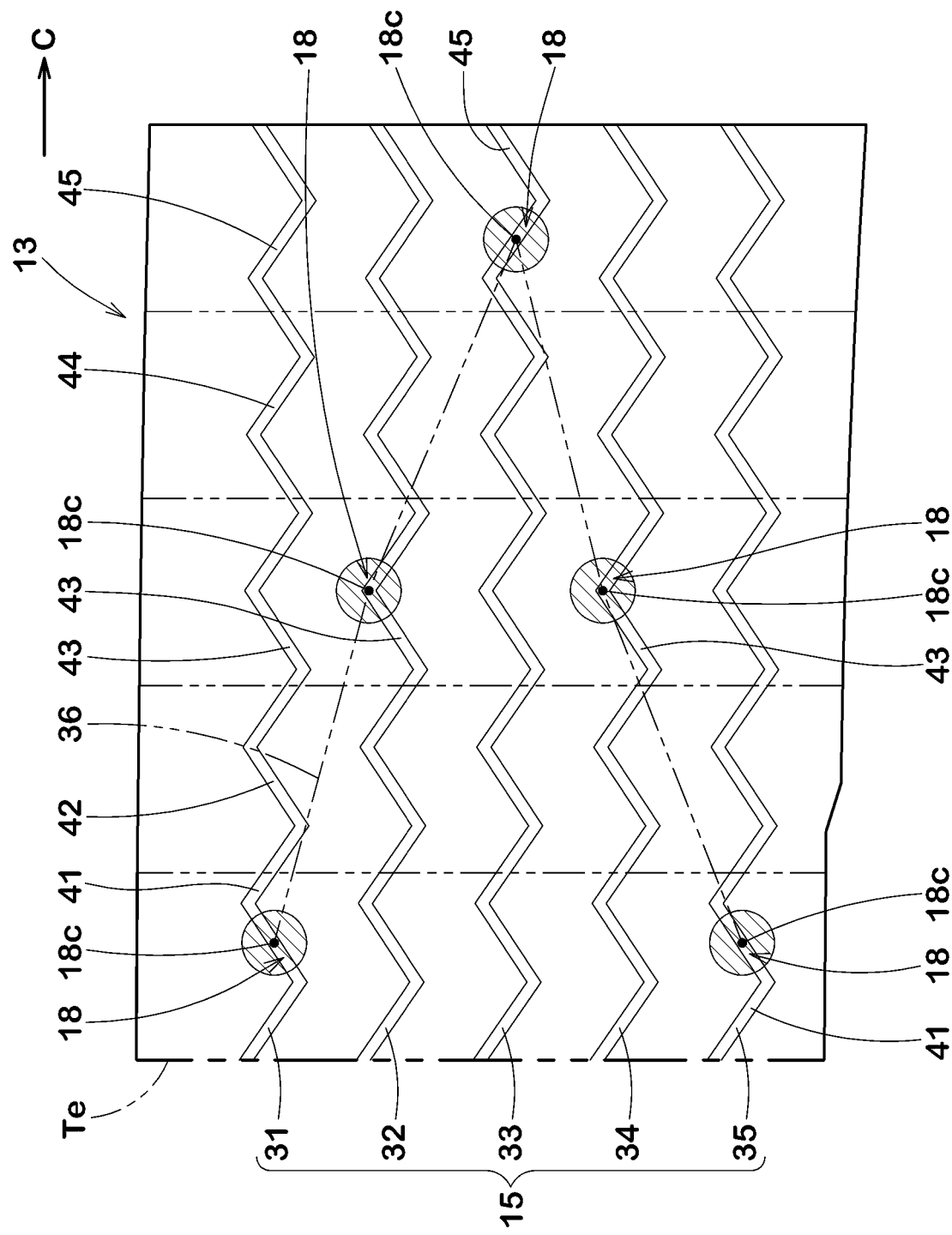

FIG. 13 shows a top view of the first block 13 as still another example of the tie bar arrangement. In this example,
the first position is located in the first part 41 of the first sipe 31,
the second position is located in the third part 43 of the second sipe 32,
the third position is located in the fifth part 45 of the third sipe 33,
the fourth position is located in the third part of the fourth sipe 34, and
the fifth position is located in the first part 41 of the fifth sipe 35.

As a result, the tie bar arrangement lines 36 are bent convexly toward the tire equator C.

In such arrangement of the sipes 15, since two tie bars 18 on the most tread edge Te side (the tie bar 18 of the first sipe 31 and the tie bar 18 of the fifth sipe 35), are separated in the tire circumferential direction, improvement in wandering performance can be expected while obtaining the above effects.

As a modified example of that shown in FIG. 13, it is possible that the center 18c of the tie bar 18 of the first sipe 31 and the center 18c of the tie bar 18 of the fifth sipe 35 are displaced from each other in the tire axial direction.

Further, it is possible that the center 18c of the tie bar 18 of the second sipe 32 and the center 18c of the tie bar 18 of the fourth sipe 34 are displaced from each other in the tire axial direction. Thereby, uneven wear of the first block 13 is suppressed.

Hereinafter, the features of one sipe 15 will be described in more detail.

The features described below are applicable to the first sipe 31 through fifth sipe 35 described above.

As shown in FIG. 4, the sipe 15 is divided into at least a first portion 16 and a second portion 17 in the sipe length direction by one tie bar 18.

In the region between the tie bar 18 and the ground contacting top surface 13s of the first block 13, the boundary between the first portion 16 and the second portion 17 is an imaginary line (not shown) which is obtained by extending the center line in the width direction of the tie bar 18 toward the outside in the tire radial direction.

The bottom 16d of the first portion 16 communicates with a first wide portion 21 having a circular cross section.

The first wide portion 21 has a groove width larger than the sipe width in the first portion 16 as shown in FIG. 5.

The first wide portion 21 extends linearly along the sipe length direction of the first portion 16 over its entire length as shown in FIG. 4.

Similarly, the bottom 17d of the second portion 17 communicates with a second wide portion 22 having a circular cross section as shown in FIGS. 4 and 5.

The second wide portion 22 has a groove width larger than the sipe width in the second portion 17.

The second wide portion 22 extends linearly along the sipe length direction of the second portion 17 over its entire length.

The first wide portion 21 and the second wide portion 22 do not communicate with each other.

Since the above-described sipe 15 comprises the first wide portion 21 and the second wide portion 22, which are not in communication with each other.

Even if the first block 13 collapses, strain is dispersed at the bottom of the sipe 15, and damage to the sipe can be suppressed.

In addition, since the first wide portion 21 and the second wide portion 22 exhibit excellent water absorption performance, the on-ice performance can be further improved.

The shape of the cross section of the first wide portion 21 and the second wide portion 22 is not limited to circular, and may be triangular, for example.

As shown in FIG. 5, in the cross section of the sipe 15, the sipe 15 extends in the tire radial direction with a constant width W2.

Further, as shown in FIG. 6, the sipe 15 extends in its length direction while maintaining the constant width W2 described above. That is, the sipe 15 extends with the constant width W2 over its entirety.

For example, the width W2 is preferably not more than 1.0 mm, more preferably 0.2 to 0.7 mm.

As a result, the load bearing performance and the on-ice performance are improved in a well-balanced manner.

The present disclosure is however, not limited to such configuration.

Further, inevitable errors occurs in rubber products such as tires can be allowed.

Therefore, the width of the sipe 15 may vary depending on its measurement position.

In this case, it is preferable that the ratio W2M/W2m between the maximum value W2M and the minimum value W2m (not shown) of the width of the sipe 15 is not more than 2.0.

The maximum value W2M is preferably 0.4 to 0.7 mm. The minimum value W2m is desirably 0.2 to 0.4 mm.

As shown in FIG. 7, the maximum depth d3 from the ground contacting top surface 13s of the first block 13 to the bottom of the first wide portion 21 is 4.0 to 9.0 mm. The maximum depth d4 from the ground contacting top surface of the first block 13 to the bottom of the second wide portion 22 is 4.0 to 9.0 mm.

As a result, the load bearing performance and the on-ice performance can be improved in a well-balanced manner.

Preferably, the depth d3 is the same as the depth d4.

As shown in FIG. 4, the first wide portion 21 extends linearly in the sipe length direction of the sipe 15 while maintaining a circular area in the cross section.

As a result, the first wide portion 21 is configured in a columnar shape except for the communicating portion with the sipe 15.

The centers of the circular cross sections of the first wide portion 21 collectively form a central axis of the first wide portion 21, and this central axis extends linearly.

The same applies to the second wide portion 22.

However, the first wide portion 21 and the second wide portion 22 are not limited to such linearly extending shape, and the central axis may extend in a zigzag shape.

As shown in FIG. 5, the diameter L1 in the cross section of the first wide portion 21 is preferably not less than 2.0 times, more preferably not less than 3.0 times, but preferably not more than 6.0 times, more preferably not more than 5.0 times the width W2 of the sipe 15 in the cross section.

As a result, the above effects can be obtained while demonstrating excellent dimoldability during tire production.

In addition, the above-mentioned "width in the cross section of the sipe 15" means the constant width W2 in this embodiment, and means the maximum width when the width varies depending on the measurement position.

From a similar point of view, the diameter of the second wide portion 22 in its cross section is preferably not less than 2.0 times, more preferably not less than 3.0 times, but preferably not more than 6.0 times, more preferably not more than 5.0 times the width of the sipe 15 in its cross section.

As shown in FIG. 2, the tread portion 2 in the present embodiment comprises a cap tread rubber layer Cg and a base tread rubber layer Bg.

The cap tread rubber layer Cg forms a ground contacting surface of the tread portion 2.

The base tread rubber layer Bg is disposed radially inside the cap tread rubber layer Cg.

The rubber hardness of the cap tread rubber layer Cg is, for example, in a range from 40 to 65 degrees.

The base tread rubber layer Bg has a rubber hardness greater than that of the cap tread rubber layer Cg.

The rubber hardness of the base tread rubber layer Bg is, for example, in a range from 65 to 90 degrees.

In this specification, the rubber hardness means the type-A durometer hardness measured at 23 deg. C. according to Japanese Industrial Standard (JIS) K6253.

In the present embodiment, the distance t2 in the tire radial direction from the ground contacting surface of the tread portion 2 to the boundary 25 between the cap tread rubber layer Cg and the base tread rubber layer Bg, is in a range from 30% to 70% of the total thickness t1 of the tread rubber.

On the other hand, as shown in FIG. 5, the minimum distance t3 in the tire radial direction from the boundary 25 to the bottoms of the first wide portion 21 and the second wide portion 22 is not less than 0.5 mm, preferably from 1.5 mm to 4.0 mm.

This effectively suppresses rubber separation at the boundary 25 due to deformation of the first wide portion 21 and the second wide portion 22.

While detailed description has been made of preferable embodiments of the present disclosure, the present disclosure can be embodied in various forms without being limited to the illustrated embodiments.

STATEMENT OF THE PRESENT DISCLOSURE

The present disclosure is as follows:

[Present Disclosure 1]

A tire comprising a tread portion provided with a plurality of blocks including at least one first block provided with a plurality of sipes extending in a tire axial direction and arranged at intervals in a tire circumferential direction, wherein each of the plurality of sipes has a zigzag portion in a cross section perpendicular to the length direction of the sipe, and a zigzag portion in a cross section parallel to the ground contacting top surface of the first block, each of the plurality of sipes is provided with a tie bar protruding radially outwardly from a bottom of the sipe and terminating without reaching the ground contacting top surface, and the plurality of sipes includes a first sipe having the tie bar at a first position in the tire axial direction, and a second sipe having the tie bar at a second position in the tire axial direction different from the first position.

[Present Disclosure 2]

The tire according to Present Disclosure 1, wherein the above-said at least one first block is a plurality of the first blocks which are arranged in the tire circumferential direction so as to form a tread edge of the tread portion.

[Present Disclosure 3]

The tire according to Present Disclosure 1 or 2, wherein
the first position of the first sipe is located in a central part when the first sipe is divided into three equal parts in the sipe length direction, and
the second position of the second sipe is located in a center part when the second sipe is divided into three equal parts in the sipe length direction.

[Present Disclosure 4]

The tire according to Present Disclosure 1, 2 or 3, wherein in a top view of the first block, a virtual zone, which is formed by extending an axial extent of the tie bar of the first sipe toward the second sipe in parallel with the tire circumferential direction, partially overlaps with the tie bar of the second sipe.

[Present Disclosure 5]

The tire according to Present Disclosure 1, 2 or 3, wherein, in a top view of the first block, a virtual zone, which is formed by extending an axial extent of the tie bar of the first sipe toward the second sipe in parallel with the tire circumferential direction, does not overlap with the tie bar of the second sipe.

[Present Disclosure 6]

The tire according to any one of Present Disclosures 1 to 5, wherein in the first block, the first sipe and the second sipe are alternately arranged in the tire circumferential direction.

[Present Disclosure 7]

The tire according to any one of Present Disclosures 1 to 5, wherein the plurality of sipes includes a third sipe having the tie bar at a third position in the tire axial direction different from the first position and the second position.

[Present Disclosure 8]

The tire according to Present Disclosure 7, wherein the second sipe is arranged between the first sipe and the third sipe, and the second position is between the first position and the third position in the tire axial direction.

DESCRIPTION OF THE REFERENCE SIGNS 2 tread portion
11 block
13 first block
15 sipe
15d sipe bottom
18 tie bar
31 first sipe
32 second sipe

The invention claimed is:

1. A tire comprising a tread portion provided with a plurality of blocks including first blocks as shoulder blocks arranged in a tire circumferential direction along a tread edge of the tread portion,
wherein each of the first blocks is provided with a plurality of zigzag sipes extending in a tire axial direction in parallel with each other across the entire width of the first block and arranged at intervals in the tire circumferential direction,
in each of the first blocks, each of the zigzag sipes has a zigzag portion in a cross section perpendicular to the length direction of the zigzag sipe, and a zigzag portion in a cross section parallel to a ground contacting top surface of the first block,
each of the zigzag sipes is provided with a single tie bar protruding radially outwardly from a bottom of the zigzag sipe and terminating without reaching the ground contacting top surface of the first block, and
the tie bars of the respective zigzag sipes are arranged such that, between the circumferentially adjacent zigzag sipes, positions in the tire axial direction of the tie bars are different from each other.

2. The tire according to claim 1, wherein the position in the tire axial direction of the single tie bar of each zigzag sipe is located in a central part when the zigzag sipe is divided into three equal parts in the length direction of the zigzag sipe.

3. The tire according to claim 2, wherein in each of the first blocks, the tie bars of the respective zigzag sipes are, from a zigzag sipe on the most one side in the tire circumferential direction to a zigzag sipe on the most other side in the tire circumferential direction, gradually shifted from one side to the other side in the tire axial direction.

4. The tire according to claim 3, wherein in a top view of each of the first blocks, the tie bars of the respective zigzag sipes are arranged such that, between the circumferentially adjacent zigzag sipes, extents in the tire axial direction of the respective tie bars partly overlap with each other in the tire axial direction.

5. The tire according to claim 2, wherein in each of the first blocks, the tie bars of the respective zigzag sipes are arranged in a staggered or zigzag manner from a zigzag sipe on the most one side in the tire circumferential direction to a zigzag sipe on the most other side in the tire circumferential direction.

6. The tire according to claim 5, wherein in a top view of each of the first blocks, the tie bars of the respective zigzag sipes are arranged such that, between the circumferentially adjacent zigzag sipes, extents in the tire axial direction of the respective tie bars does not overlap with each other in the tire axial direction.

7. The tire according to claim 1, wherein in each of the zigzag sipes when divided into five equal parts in the longitudinal direction of the zigzag sipe which are a first part, a second part, a third part, a fourth part and a fifth part in this order, the single tie bar is located in a second part, a third part, or a fourth part, and
in each of the first blocks, the tie bars of the respective zigzag sipes are arranged in a staggered or zigzag manner from a zigzag sipe on the most one side in the tire circumferential direction to a zigzag sipe on the most other side in the tire circumferential direction.

8. The tire according to claim 7, wherein in a top view of each of the first blocks, the tie bars of the respective zigzag sipes are arranged such that, between the circumferentially adjacent zigzag sipes, extents in the tire axial direction of the respective tie bars does not overlap with each other in the tire axial direction.

9. The tire according to claim 1, wherein in each of the zigzag sipes when divided into five equal parts in the longitudinal direction of the zigzag sipe which are a first part, a second part, a third part, a fourth part and a fifth part in this order, the single tie bar is located in a first part, a third part, or a fifth part, and
in each of the first blocks, the tie bars of the respective zigzag sipes are arranged in a staggered or zigzag manner from a zigzag sipe on the most one side in the tire circumferential direction to a zigzag sipe on the most other side in the tire circumferential direction.

10. The tire according to claim 9, wherein in a top view of each of the first blocks, the tie bars of the respective zigzag sipes are arranged such that, between the circumferentially adjacent zigzag sipes, extents in the tire axial direction of the respective tie bars does not overlap with each other in the tire axial direction.

* * * * *